United States Patent [19]
Kuipers et al.

[11] Patent Number: 5,673,794
[45] Date of Patent: Oct. 7, 1997

[54] CONSTRAINING SLEEVE DEVICE FOR STABILIZING BATTERY CASING CONTOUR

[75] Inventors: Roy Kuipers, Rockwall; Patrick K. Ng, Plano, both of Tex.

[73] Assignee: Lucent Technologies Inc., Murray Hill, N.J.

[21] Appl. No.: 462,313

[22] Filed: Jun. 5, 1995

[51] Int. Cl.⁶ .................................................. F17C 1/06
[52] U.S. Cl. ........................ 206/703; 206/588; 429/187
[58] Field of Search .............................. 206/703, 705, 206/588, 521; 429/187, 176, 163, 148

[56] References Cited

U.S. PATENT DOCUMENTS

| | | | |
|---|---|---|---|
| 3,093,515 | 6/1963 | Rector | 429/187 |
| 4,431,717 | 2/1984 | Kikuchi | 429/176 |
| 5,255,782 | 10/1993 | Carroll, Jr. | 206/703 |
| 5,283,137 | 2/1994 | Ching | 429/187 |

*Primary Examiner*—Paul T. Sewell
*Assistant Examiner*—Nhan T. Lam
*Attorney, Agent, or Firm*—A. G. Steinmetz

[57] ABSTRACT

A constraining sleeve device is applied to a plastic battery casing to prevent distortion of the casing contour. A metal constraining sleeve slides onto and over a broad face or side of the plastic battery casing and provides constraining forces to maintain its contour. This sleeve is retained in place by end members at each end of the constraining sleeve device that engages structural features existing and located at opposing ends of the casing. In another embodiment a pair of constraining sleeve devices are applied to opposing broad sides of the battery casing.

5 Claims, 2 Drawing Sheets

FIG. 2
FIG. 4
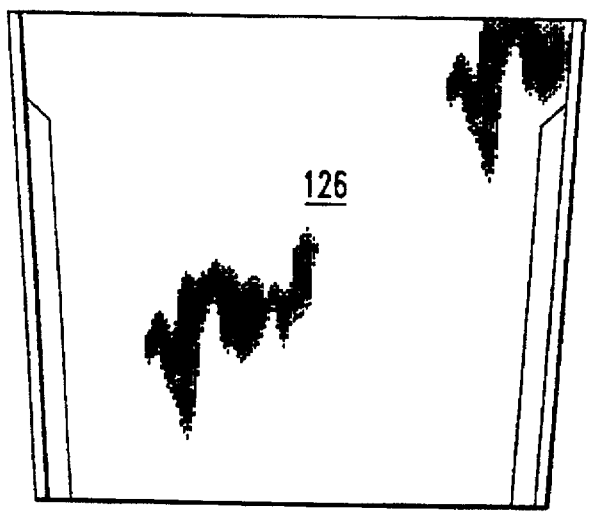
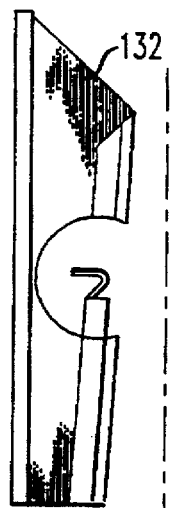
CENTER LINE
OF BATTERY
FIG. 3
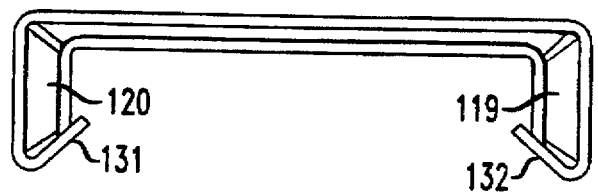

CONSTRAINING SLEEVE DEVICE FOR STABILIZING BATTERY CASING CONTOUR

FIELD OF THE INVENTION

This invention relates to batteries with plastic casing enclosures and in particular to a constraining sleeve device for stabilizing the plastic casing enclosure according to a predetermined contour.

BACKGROUND OF THE INVENTION

Lead acid batteries are commonly manufactured with a battery casing made of plastic materials. In situations where the battery is exposed to high temperatures, the plastic material may soften and the contour of the casing deflects or deforms (i.e., the casing bulges) outward effectively changing the contour and dimensions of the battery casing. This change in contour adversely affects battery performance and may lead to its catastrophic failure. One solution to this problem, involves inserting the battery into a metal can. This is not satisfactory, however, because the plastic casing is tapered due to manufacturing moulding requirements in making the plastic battery casing. Gaps develop between the metal can and battery, because of the taper, allowing the battery to deform. In certain circumstances, the casing and can may actually separate.

Another solution to the battery case deformation problem is to reduce the opening pressure required of the battery safety valve. In operation, a very small amount of gas(es) is generated to cause a positive pressure inside the battery. This internal pressure is relieved by the safety valve which is designed to open at a specified pressure. Case deformation is less with a lower opening pressure. Reducing the opening pressure, however, adversely affects the rate at which the battery loses water at high temperatures and degrades the performance and life of the battery.

SUMMARY OF THE INVENTION

According to the invention, a constraining sleeve device is applied to a plastic battery casing to maintain its dimensions as described hereinafter.

In the described illustrative embodiment, a metal constraining sleeve slides onto and over a broad face or side of a plastic battery casing to maintain its contour. This sleeve is retained in place by end members at each end of the constraining sleeve device that engages structural features existing and located at opposing ends of the casing. In another illustrative embodiment a pair of constraining sleeve devices are applied to opposing broad flat faces or sides of the battery casing.

BRIEF DESCRIPTION OF THE DRAWINGS

FIGS. 2, 3 and 4 are orthogonal plan elevation and ends of the metallic constraining sleeve device.

DETAILED DESCRIPTION

Figure 1:
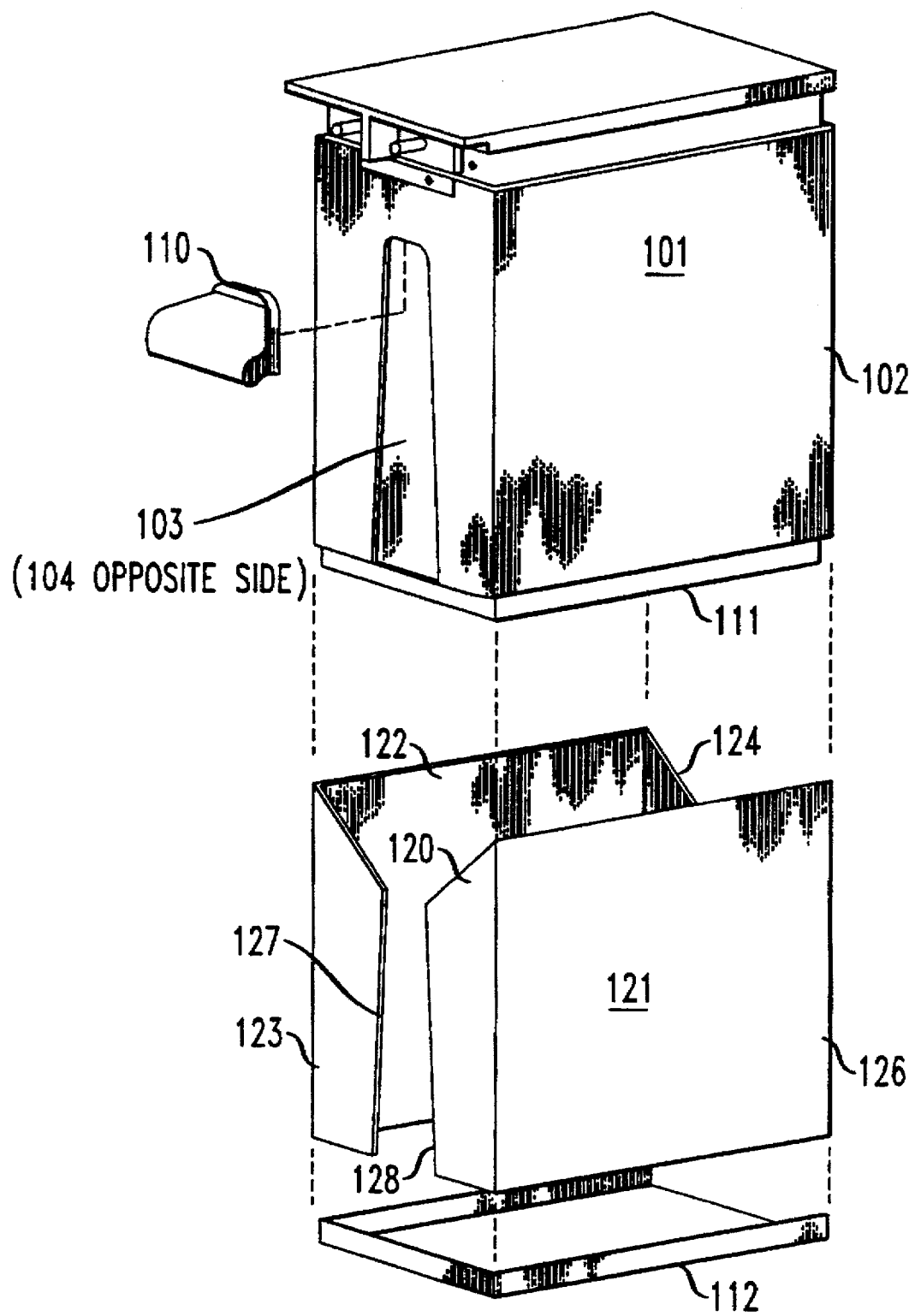
FIG. 1 is an exploded pictorial view of a battery casing and a metallic constraining sleeve device for application and connection to the battery casing.

A single battery cell 101 is shown in the exploded view of FIG. 1. This cell may be combined with other cells to form a modular battery plant by physically stacking and joining electrical terminals of adjacent battery cells with electrical connections. A description of those modular arrangements (which do not form a part of the present invention) are to be found in U.S. Pat. No. 4,957,829.

The casing structure of cell 101 includes a broad side/face 102 which in response to pressure inside the cell and elevated temperature(s) may become distended resulting in distortion of the casing contour and degradation of battery performance. At each end of the cell 101 is a dovetail shaped concave cutout (mortise) 103 and 104 (only one end is visible in FIG. 1). Those mortises are tapered to form a V-like shape. A handle 110 may be secured by these mortises at each end of the cell 101. The base of the handle is dovetail shaped (tenon) to conform to the contour of the mortise. Each handle slides into and is secured by the mortise at each end of the cell 101 (only one handle shown).

Metallic constraining devices are provided, as shown in the FIG. 1, to attach to and constrain opposing faces of the battery case casing 101, (the surface most susceptible to deform) to a desired contour (only face 102 is shown). The two sleeves are identical and are intended to be used separately or in pairs.

The sleeve has two end members (faces) 123 and 124. The edges 127 and 128 of each end face (only one end face is shown) are oriented/angled to conform to the edges of the mortises 103 and 104. Each end face has a bent over lip along the extent of each edge to contiguously engage face(s) of the mortises 103 and 104.

The sleeve is made of metal coated with a epoxy. The material composition, thickness and bend radii are selected to properly restrain the deformation of the cell casing face. Determination of the design parameters are within the skill of the art and it is not believed necessary to disclose these parameters in detail herein.

The sleeve device is self-locking onto the face(s) of mortise(s) and hence prevents it from disengaging from the battery casing once installed. The fit between battery cell casing and constraining sleeve device is selected to insure that the fit is under tension, thus insuring that the sleeve and end member conform to the external shape at the battery casing and has guaranteed physical contact with the desired restraining force applied to the casing face.

The constraining sleeve device advantageously permits the use of the battery handle 110 without redesign of the handle required. In some applications, the constraining device may be applied to one side only of the battery casing where such application is sufficient to prevent undesirable distortion.

The constraining sleeve device is shown in the orthogonal projections of FIGS. 2, 3 and 4. The device has a base member 126 having a planar stratum configuration for contiguous force application to a casing wall to prevent deformation at the casing wall and two end members 120 and 119 that have edges designed to correspond with the taper of the mortises, when the end members are bent into the final shape as shown. The folded over edges 131 and 132 of the end members 120 and 119, engage the underside of the mortises (features of the ends) in order to secure the device to the battery casing. The constraining device may be stamped and formed from sheet metal and bent to generate the features which conform it to the battery casing.

The end view of FIG. 4 shows the relation of the device to the center fine of the battery casing when the device is installed. A cutaway detail view in FIG. 4 shows the bend of the folded edges 131 and 132.

The invention claimed is:

1. A system for constraining side wall deformation of a battery casing, comprising:

a metal constraining sleeve for sliding onto and over a broad face or side of a plastic battery casing to maintain its contour, said sleeve being retained in place by end members comprising bent metal forming a tenon at each end of the sleeve that engage mortises existing and located at opposing ends of the battery casing, each of said tenons conforming to a shape of said mortises.

2. A system for constraining side wall deformation of a battery casing as recited in claim 1, wherein each of said mortises is a dovetailed concave cutout; and each of said tenons is dovetail shaped to conform to the contour of each of said mortises.

3. A contour retaining structure for application to a battery casing for restraining deformation of sidewalls of the battery casing, comprising:

a constraining sleeve for the application to a wall of the battery casing for restraining deformation of the wall from its original contour, the constraining sleeve formed from a metal sheet including first and second end members defined by ends of the sheet bent and cut to form structural features that engage dovetail shaped mortises at each end of the battery casing, and further having bent edges of the end members to lock onto the mortises at each end of the battery casing, and the structural features being dimensioned so that an unbent portion of the sheet engages the battery casing so as to apply a contour restraining pressure on at least one wall of the battery casing.

4. A contour retaining structure for application to a battery casing for restraining deformation of sidewalls of the battery casing, as claimed in claim 3, comprising:

the structural features including a bent over lip along the edges of the end members for contiguously engaging the mortises, and the mortise has a V shape for enabling locking of the constraining sleeve to the battery casing.

5. A contour retaining structure for application to a battery casing for restraining deformation of sidewalls of the battery casing, as claimed in claim 4, wherein:

the sleeve is coated with an epoxy.

* * * * *